United States Patent [19]

Gillard et al.

[11] Patent Number: 4,862,267

[45] Date of Patent: Aug. 29, 1989

[54] MOTION COMPENSATED INTERPOLATION OF DIGITAL TELEVISION IMAGES

[75] Inventors: Clive H. Gillard, Basingstoke; David A. Dougall, Reading, both of United Kingdom

[73] Assignee: Sony Corp., Tokyo, Japan

[21] Appl. No.: 199,682

[22] Filed: May 31, 1988

[30] Foreign Application Priority Data

Jun. 9, 1987 [GB] United Kingdom ............... 8713454
Dec. 4, 1987 [GB] United Kingdom ............... 8728452

[51] Int. Cl.[4] .................................................. H04N 7/01
[52] U.S. Cl. .................................. 358/140; 358/105; 358/136; 358/160
[58] Field of Search ............... 358/140, 105, 136, 135, 358/138, 160

[56] References Cited

U.S. PATENT DOCUMENTS 4,729,021 3/1988 Kondo ............................ 358/105
4,802,005 1/1989 Kondo ............................ 358/105

OTHER PUBLICATIONS

BBC Research Department Report 1985/5.
"The Improved Display of 625-Line Television Pictures: Adaptive Interpolation"-A. Roberts (5 pages).

Primary Examiner—Howard W. Britton
Attorney, Agent, or Firm—Alvin Sinderbrand

[57] ABSTRACT

A motion compensated interpolator for digital television images comprises a three-dimensional variable separable finite impulse response interpolation filter operating in the horizontal, vertical and temporal domains.

26 Claims, 11 Drawing Sheets

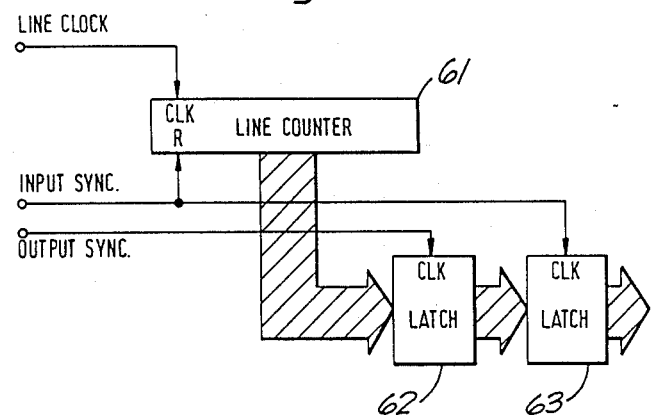
Fig. 4.
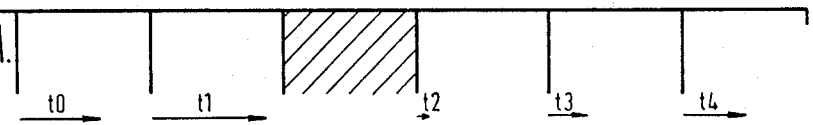
Fig. 5A.
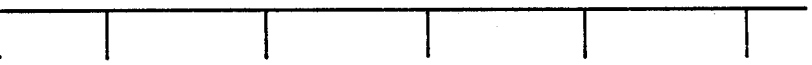
Fig. 5B.
Fig. 5C.
Fig. 5D.
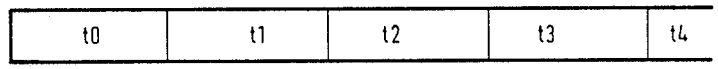
Fig. 5E.
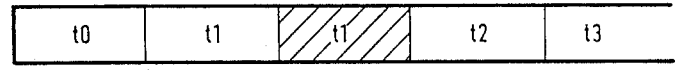

Fig. 6.
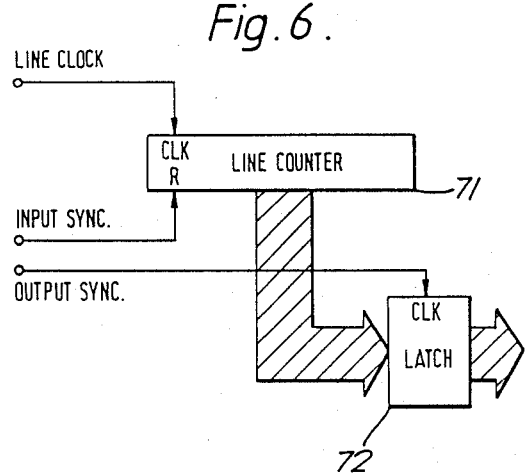
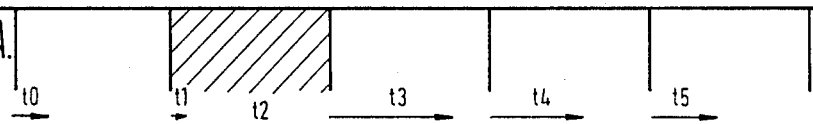
Fig. 7A.
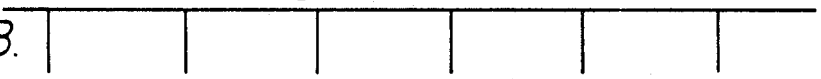
Fig. 7B.
Fig. 7C.
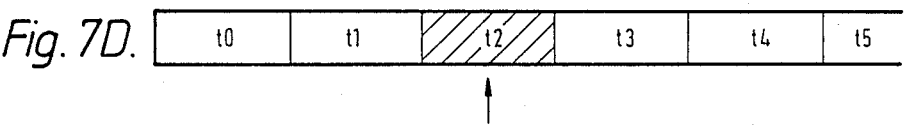
Fig. 7D.

Fig. 9D.
Fig. 9E. FIELD 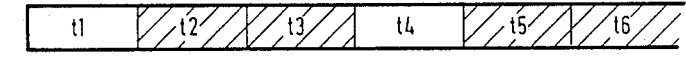
Fig. 9F. LINE

Fig. 9H.
Fig. 10.
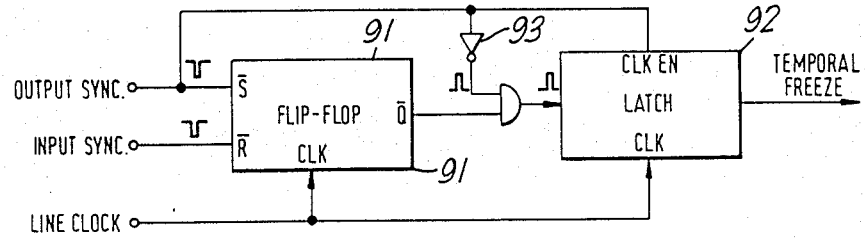

MOTION COMPENSATED INTERPOLATION OF DIGITAL TELEVISION IMAGES

CROSS-REFERENCE TO RELATED APPLICATIONS

This application is related to the following applications for U.S. Letters Patent, each of which was filed concurrently herewith, that is, on May 31, 1988, and has a common assignee herewith:

Serial Nos. 199,680, 199,681, 199,683, 200,421, 200,503, 200,531, 200,562

BACKGROUND OF THE INVENTION

1. Field of the Invention

This invention relates to motion compensated interpolation of digital television images. Such interpolation is particularly, but not exclusively, used in television standards converters and in slow motion processors.

2. Description of the Prior Art

International television program exchange necessitates standards converters due to the different television standards used in different countries, for example, the 625-line 50-fields per second (625/50) PAL system used in the UK, and the 525-line 60-fields per second (525/60) NTSC system used in the USA.

Many different standards converters have been previously proposed. One of the best known is the ACE (Advanced Conversion Equipment) developed by the British Broadcasting Corporation. Basically ACE operates on an input digital television signal line-by-line to derive interpolated samples required to form an output digital television signal. Interpolation is done not only spatially using four successive horizontal scan lines of the input television signal, but also temporally using four successive fields of the input television signal. Thus, each line of the output television signal is derived by multiplying respective samples from sixteen lines of the input television signal by respective weighting coefficients.

Further details of ACE will be found in UK patent specification GB-A No. 2 059 712 and in 'Four-field digital standards converter for the eighties' by R N Robinson and G J Cooper at Pages 11 to 13 of 'Television' (the journal of the Royal Television Society) for January/February 1982).

Although ACE gives good results, there is the problem that the equipment is very bulky. To overcome this problem, we have previously proposed a television standards converter comprising three field stores and four 4-line stores for receiving an input digital television signal of one standard and deriving therefrom arrays of sixteen lines, each array consisting of four successive lines from each of four successive fields of the input television signal. A weighting coefficient store stores sets of sixteen weighting coefficients, respective sets corresponding to positions both spatial and temporal of respective lines of an output digital television signal of a different standard, relative to the sixteen lines of the input television signal. Two interpolation filters then derive line by-line the output television signal by multiplying corresponding sample values from each of the sixteen lines of the input television signal by a respective weighting coefficient in a set of weighting coefficients and sum the resulting products to form an interpolated sample value, and four output field stores receive and store the derived lines of the output television signal. To store the additional lines which are derived when the output television signal has more lines than the input television signal, a 45-line store in interposed between one of the interpolation filters and the output field stores. Further details will be found in out UK patent specification GB-A No. 2 140 644.

The performance of such standards converters which employ vertical/temporal interpolation techniques represents a comprise between generating blurred pictures while maintaining good motion portrayal and maintaining vertical resolution but at the expense of 'judder'. The former is a result of post filtering in order to prevent disturbing alias effects; the latter is a result of the intrusion of the adjacent two-dimensional repeat sample structures.

We have therefore proposed that motion vector estimation should be incorporated in television standards converters and in slow motion processors. The problem with the majority of existing motion vector estimation methods is that their use is biased towards video conference type applications where generally the subject matter is either a single person's head and shoulders or a small group of people seated around a table. With television images of this type the motion is relatively simple in comparison with broadcast television images where for example at a horse race meeting the camera could be following the leaders in a race. In this situation the motion would be complex, for example, because the camera would be panning. Thus, the background may well be moving at speeds greater than eight pixels per field, while in the foreground there would be at least one horse galloping. This means that the motion vector estimation method must try to track the horses legs, which may well be moving in different directions to that of the already moving background.

Motion adaptive interpolation has been proposed for example in the NHK 1125-lines 60-fields per second high definition video signal (HDVS) system to 625-lines 50-fields per second PAL system downconverter. This downconverter effects interpolation in two stages. Firstly, a scan conversion process converts 1125 lines to 625 lines; this being readily possible due to the greater amount of data available in the HDVS system. This is followed by interpolation which removes purely temporal alias artifacts.

SUMMARY OF THE INVENTION

One object of the present invention is to provide an improved method of motion compensation interpolation of digital television images.

Another object of the present invention is to provide an improved apparatus for motion compensated interpolation of digital television images.

Another object of the present invention is to provide an improved television standards converter.

Another object of the present invention is to provide an improved slow motion processor.

According to the present invention there is provided a method of motion compensated interpolation of digital television images using an interpolator comprising a three-dimensional finite impulse response interpolation filter operating in the horizontal, vertical and temporal domains.

According to the present invention there is also provided a motion compensated interpolator for digital television images comprising a three-dimensional finite impulse response interpolation filter operating in the horizontal, vertical and temporal domains.

The above, and other objects, features and advantages of this invention will be apparent from the following detailed description of illustrative embodiments which is to be read in connection with the accompanying drawings.

BRIEF DESCRIPTION OF THE DRAWINGS

FIG. 4 shows part of the standards converter of FIG. 3 in more detailed block diagrammatic form;

FIGS. 5A-5E show time charts for explaining the operation of FIG. 4;

FIG. 6 shows part of the standards converter of FIG. 2 in more detailed block diagrammatic form;

FIGS. 7A-7D show time charts for explaining the operation of FIG. 6;

FIGS. 9A-9H show time charts for explaining the operation of FIG. 8;

FIG. 10 shows part of the standards converter of FIG. 2 in more detailed block diagrammatic form;

DESCRIPTION OF THE PREFERRED EMBODIMENTS

In order more readily to understand the motion adaptive interpolation which forms the subject of the present invention, the form and operation of two standards converters and a slow motion processor which use such motion adaptive interpolation will first be described. The standards converters to be described maintain vertical resolution and remove the 'judder' by compensating for motion between fields. In effect the motion between consecutive fields is analyzed. These fields can then be 'aligned' pixel by pixel such that they represent static pictures upon which conversion can then take place. As a result, vertical resolution can be maintained.

The standard converters to be described can be divided into two parts. The first part is analogous to a known standards converter performing vertical/temporal interpolation to converter between 525/60 and 625/50 television standards. Alone, this would generate an output in which vertical resolution would be maintained but with the added effect of judder. To remove this judder four fields of the input digital television signal which are used in the conversion process are aligned under the control of motion vectors generated from a motion analyzer which forms the second part of the standards converter.

Figure 1:
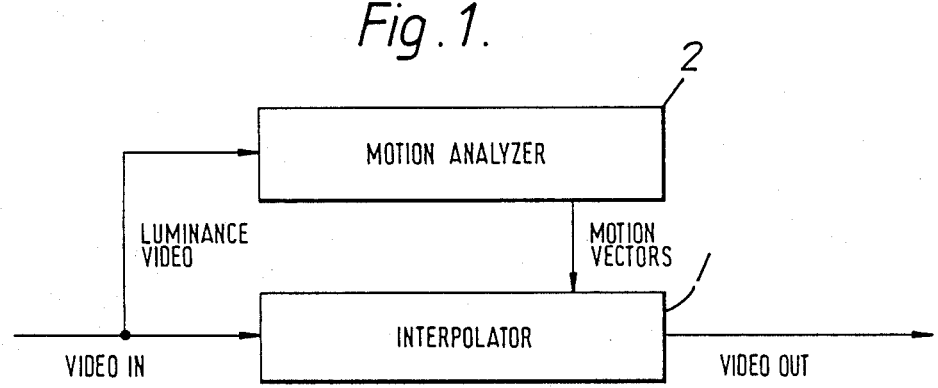
FIG. 1 shows in very simplified block diagrammatic form a television standards converter.

This is shown is very simplified diagrammatic block form in FIG. 1. The video portion of a input digital television signal of one standard, which may for example have been derived by sampling an analog television signal at 13.5 MHz, is supplied to an interpolator 1 from which the video portion of the required output television signal of a different standard is derived. A motion analyzer 2 receives the luminance video and derives motion vectors which provide data representing the motion between successive fields of the input television signal to control the operation of the interpolator 1. The interpolator 1 operates in a generally similar manner to the corresponding portion of a known standards converter, for example as referred to above. It also, however, contains the means to align the four fields used in the interpolation, under the control of the motion vectors.

The repositioning of the four fields is performed in two stages. The first stage involves varying the address of a variable delay element associated with each field to reposition the picture to the nearest line or sample. The second stage uses interpolation techniques both vertically and horizontally to reposition to within $\pm 1/16$ line or $\pm \frac{1}{8}$ of a sample. Even with no movement, both the above techniques are used to enable conversion of line standards.

The vertical interpolator has four taps per field allowing effectively an 8-tap vertical filter to be applied to the static pictures. An 8-tap interpolator allows good vertical resolution to be maintained with minimal distortion. The effect of distortion in the horizontal interpolator is less of a problem, so a 2-tap horizontal filter is used, although a 4-tap horizontal filter, for example, may be used.

The temporal interpolator is used in normal operation to enable interpolation of perspective changes or when no sensible motion vector can be detected, in which case the interpolator 1 must revert to normal standards conversion operation where no picture re-positioning occurs.

When converting from a high field rate to a lower rate, the incoming fields are interpolated such that an interpolated field can occasionally be dropped without any movement deterioration. All the interpolation is done at the input field rate and passed to a time base corrector which then spreads the fields generated over the required time period for the output standard.

The above operation is necessary when converting from 585/60 to 625/50. It is also evident however that 625 lines must be generated where only 525 lines exist in the input signal.

To overcome the line number conversion problem a second time base corrector is used at the input to produce a signal having 525 lines at the 60 Hz rate. A 585-line format can contain all the active picture information in the 625-line format. Following this first time base corrector there are occasional lines which have no video information. The interpolator stores are frozen during this time, so that an additional interpolated line can be generated from the same lines used to generate the previous output line. This process allows 625 lines to be interpolated from the original 525.

The reason for selecting the 585/60 format will now be explained in more detail. A 625-line picture contains 288 active lines in each field, and 720 samples in each horizontal line at the sampling rate of 13.5 MHz. The circuits, to be described below, of the television standards converters of FIG. 2 and 3 use techniques which allow the picture to be shifted horizontally by plus or minus twenty-four samples. This requires a minimum horizontal blanking of forty-eight samples. The total number of sample positions required in a field is therefore:

$$(720+48) \times 288 = 221,184.$$

There are clearly considerable advantages in using a 13.5 MHz clock throughout the system, in which case the number of clock cycles within a 60 Hz period (more exactly a 59.94 Hz period) is:

$$225225.$$

If 576 lines of data are required in one frame, the number of horizontal samples would be 782.03125. Although this number is sufficient to contain the required (720+48) samples, the fractional sample would mean the structure was non-orthogonal on a line to line basis. This would cause significant design difficulties in the rest of the standards converter, so the number of lines required was gradually increased, from 576, until a whole number of samples, in fact 770, existed in each line.

The only format that achieves the orthogonal structure is the 585/60, which in addition gives a useful vertical blanking of four lines in the first field, five lines in the second field and fifty samples of horizontal blanking.

In the 625/50 to 625/50 slow motion mode referred to below there is no requirement to store the active video of the 625 format within a 60 Hz period, so the interpolation and other processing is done in the normal 625/50 format.

When converting from a low field rate to a higher rate the input time base corrector is required to produce a video stream at the output rate. This is done by occasionally repeating an input field. When the repeated field occurs, all the interpolator stores must be frozen so that the interpolation is applied to the same input fields used to create the previous output field.

If this technique were not used, two sets of interpolator and movement detector would be required to make up the missing field.

The above operation is performed when converting from 625/50 to 525/60. To allow 625 lines to exist during a 60-fields per second period again requires the 585/60 intermediate format to be adopted. During this process some of the interpolated lines will not be required, as only 525 have to be produced from the original 625. A time base converter is therefore required on the output to produce the final 525/60 format.

The amount of interpolation required is determined by comparing input and output synchronization pulse phases.

As mentioned above, motion analysis is performed on the luminance of the input video. The method employed involves a number of stages to arrive at a single motion vector for each pixel. Movement can be detected in the range ±24 pixels horizontally and ±8 (field rate) vertically.

In a first stage, motion in the picture at points on the screen spaced sixteen samples horizontally and eight lines vertically is determined using a block matching technique. The original motion vectors in a field are calculated every sixteenth sample and every eighth line. Each one of these points is at the centre of a search block. Conceptually each block is scanned ±24 samples horizontally, and +8 and −8 samples vertically over the next field each time generating the summation of the differences between the two fields over the area of the search block. The minimum overall difference then indicates in which direction the object at the point has moved.

In practice, the above technique is applied in separate steps which greatly reduces the amount and complexity of hardware required:

Step 1:
Test for minimum difference in just three positions, centre position, sixteen samples to the left, sixteen samples to the right.

Step 2: Starting from point indicated above.
Test for minimum difference in nine positions symmetrically distributed about the above starting point in steps of eight samples or lines.

Step 3: Starting from point indicated above.
Test for minimum difference in nine positions symmetrically distributed about the above starting point in steps of four samples or lines.

Step 4: Starting from point indicated above.
Test for minimum difference in nine positions symmetrically distributed about the above starting point in steps of two samples or lines.

Step 5: Starting from point indicated above
Test for minimum difference in nine positions symmetrically distributed about the above starting point in steps of one sample or line.

Step 6:
After step 5, the motion of the object has been detected to the nearest pixel. A more accurate vector value can be achieved by adding a sixth step in which the difference produced at the final position indicated by step 5 is compared with the two differences above and below to adjust the vertical vector value and with the two differences to the left and right to adjust the horizontal vector value.

The above technique relies on achieving correlation between the reference search block and a similar block of video data on the following field (the search positions). In step 5 it is possible the true movement was a half pixel more or less than detected, but it is necessary for the best correlation to occur at this point, even although exact correlation cannot be achieved. To ensure this occurs, the picture can be filtered both vertically and horizontally by a gaussian filter which has +6 dB attenuation at ½ Nyquist frequency.

Similarly, for step 4, the picture can be filtered with a 6 dB attenuation at ¼ Nyquist frequency, which allows a one pixel error in detection.

Step 3 uses a picture filtered with a 6 dB attenuation at ⅛ Nyquist frequency allowing a two pixel error.

Step 2 uses a picture filtered with a 6 dB attenuation at 1/16 Nyquist frequency allowing a four pixel error.

Finally, step 1 uses a picture filtered with 6 dB attenuation at 1/32 Nyquist frequency allowing an eight pixel error. In addition, because the pictures are so heavily filtered during steps 1, 2, 3 and 4, the samples can be reduced, for example halved in number, which still further greatly reduces the number of calculations and amount of hardware required.

The effective search block size is sixteen lines high and forty-eight samples long. A large search block is necessary to detect accurately the movement of large plain areas. The central part of plain areas are unimportant as the values of the pixel at these points do not change from one field to the next, but the edges of such objects are obviously important. If the detection of motion is limited to +24 samples horizontally and +8 lines vertically then a block of the above size would be the minimum size to ensure accurate motion detection.

In the standards converters, depending upon the conversion modes, the luminance video entering the motion analyzer 2 is in various forms of 585-lines/60-fields per second. This might comprise repeated lines for 525 input or repeated fields for 625 input. In addition, the input contains both field polarities. The first process is to ensure a continuity of data and single field polarity for the motion estimation processing. This is done by interpolation on the input data by a vector interface to maintain continuity, and filtration horizontally to aid subsequent motion detection/correlation.

Separate outputs from this circuit are passed to motion estimation vector filters and motion detection field stores/vector selectors. The output of the vector interface is, as described above, spatially continuous, single field polarity data. The output to the field stores/vector selectors depends upon the input and output modes. In some modes it is continuous, and in others it contains repeated lines/fields. The vector filters and vector calculators perform the steps outlined above.

The processing of the various steps is performed by vector calculators and a vector processor. The vector calculators perform steps 1 to 5 and the vector processor performs step 6. In addition, the vector processor performs the second stage in the motion estimation, as follows:

For each 8×16 block a choice is made of four from seven motion vectors, the seven motion vectors being the one for that particular block and the six for the six nearest blocks respectively.

In addition, the vector processor also determines the four most common motion vectors throughout the whole input field, these being called modal motion vectors. The primary use of the modal motion vectors is in the border areas close to the edge of a field where it is not possible actually to calculate any local motion vectors. Also, if any one or more of the local motion vectors are equal, then these are substituted for by the modal motion vectors.

In the next stage of motion detection, for each pixel, the four motion vectors are tested by producing the difference between the extrapolated positions on field 0 the field 1. During standards conversion a field needs to be interpolated between two fields; say between field 0 and field 1. So the motion vectors generated between these two fields are considered to be most representative of the motion. Four motion vectors are used from these two fields. To decide which is the correct motion vector a pixel from field 0 is compared with a pixel from field 1 using the motion vector to decide where the pixel to be generated had come from on field 0 and where it has gone to be field 1. Mathematically, if the position x, y, z must be generated, where; x =horizontal position, y =vertical position, z =temporal position between field 0 and field 1, the pixels used for comparison are as shown below. Field 0 is assumed to be at z=0 and field 1 at z=1.

Pixel from field 0

$$x^0 = x - (V_h * z)$$
$$y^0 = y - (V_v * z)$$

-continued

Pixel from field 1

$$x^1 = x + (1 - z)V_h$$
$$y^1 = y + (1 - z)V_v$$

$V_h$ = horizontal component of vector
$V_v$ = vertical component of vector

For each motion vector a modulus of the difference between the pixels indicated in field 0 and field 1 is found. The minimum difference is assumed, as a first estimate, to indicate the correct motion vector. If a number of motion vectors produced a very similar difference then these motion vectors are tested again using a comparison between fields −1 and 0.

Pixels from field −1

$$x^{-1} = x - (1 + z)V_h$$
$$y^{-1} = y - (1 + z)V_v$$

The minimum modulus of difference of the remaining motion vectors produced by this second test is then considered to represent most accurately the motion vector.

If a number of motion vectors again have similar differences then an option exists to assume no movement. If only the horizontal component varied and the vertical component did not, then only the horizontal component would be set to zero and the vertical component would be maintained at the detector value. If only the vertical component varied, then the horizontal component would be maintained and only the vertical component set to zero. If the pixel difference chosen is too large then an option exists to set the whole motion vector to zero in both directions.

A final stage is applied once every pixel has been assigned a motion vector. Here the motion of each pixel is tracked from one field to the next and a recursive filter applied to the vector value. This removes the effects of noise and small movement estimation errors and also smooths the trajectory of the motion vectors.

There are two possible ways of tracking the motion of a pixel.

In the first, the motion vector for a pixel in field t is used to point to a pixel in field (t+1). The motion vector determined for this pixel in field (t+1) is then recursively filtered to form the final motion vector for the pixel in field (t+1).

In the second, the motion vector for a given pixel in field t is used to point to a pixel field (t−1). The motion vector from this pixel is then recurseively filtered with the motion vector for the given pixel to form the final motion vector for this given pixel in field t.

In either case the final output is a motion vector for each pixel which is passed from the motion analyzer 2 to the interpolator 1 to be employed in aligning the four fields used in the standards conversion process.

Figure 2:
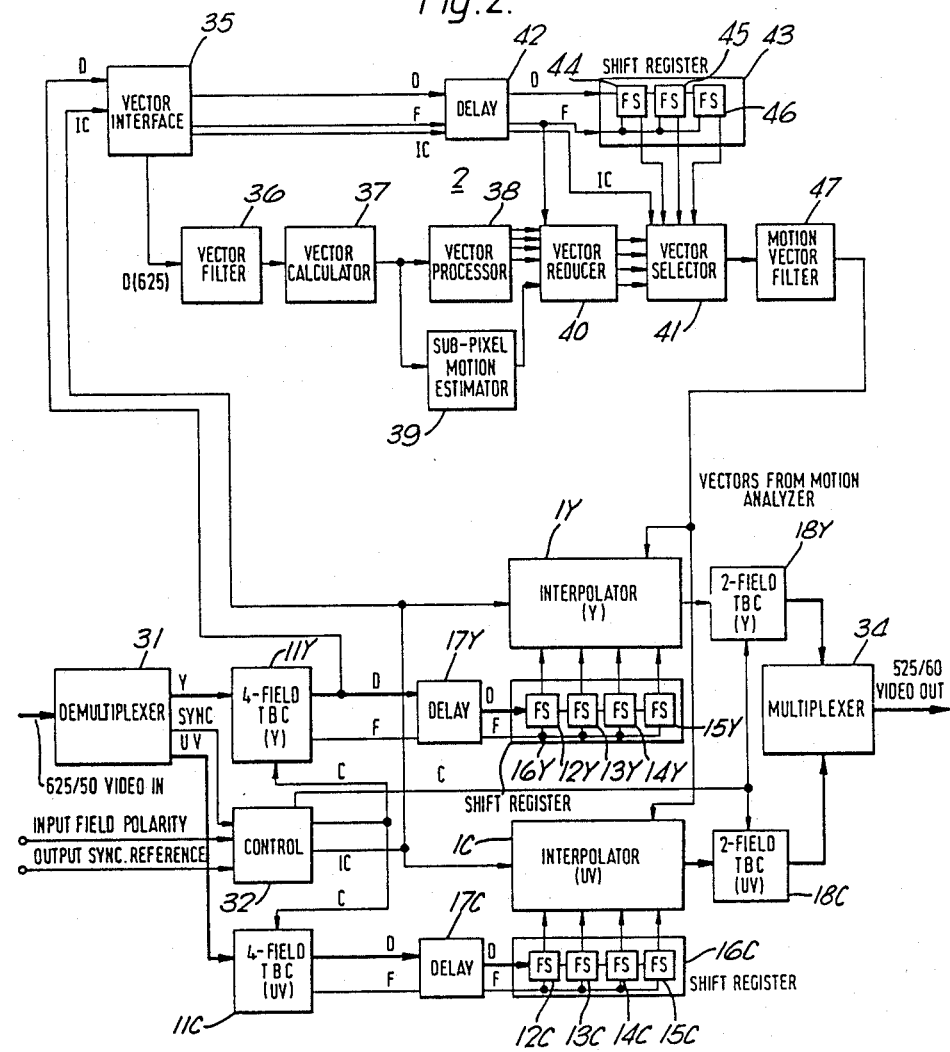
FIG. 2 shows in block diagrammatic form a first television standards converter.

The first standards converter for converting an input digital 625-line 50-fields per second television signal to an output digital 525-line 60-fields per second television signal is shown in detailed block form in FIG. 2.

The incoming video at 50-fields per second and a sample rate of 13.5 MHz, that is CCIR 601 data, is supplied to a demultiplexer 31 which separates it into luminance components Y, synchronizing signals SYNC and chrominance components UV. The luminance components Y are supplied to a 4-field luminance time-base corrector (TBC) 11Y and the chrominance components UV are supplied to a 4-field chrominance TBC 11C. The synchronizing signals SYNC are supplied to a control 32 together with an input field polarity signal from an external input, and an output field synchronizing reference signal from another external input. The TBCs 11Y and 11C occasionally repeat fields, so that the output is a 60-fields per second. The control to the TBCs 1Y and 11C which causes the repetition of a field is derived from the input field synchronization pulses, and the required output field synchronization pulses. The comparison of the synchronization pulses also provides a temporal offset figure which indicates the amount of temporal interpolation required at the outputs of the TBs 11Y and 11C such that smooth motion at 60-fields per second would be observed.

When converting from 50-fields per second to 60-fields in this way a line conversion of 625 to 525 is necessary. It is therefore necessary to maintain the original 625 lines of information at a 60-fields per second rate so that they are all available to form the interpolated lines.

The standards converter uses an intermediate standard which is capable of containing all the active vertical information of the 50-fields per second signal at the 60-fields per second rate. The intermediate standard also contains all the active line information arranged orthogonally line by line still using the original 13.5 MHz sample rate.

The intermediate standard used, and which is as explained above capable of meeting all these requirements, is a 585-line format at 60-fields per second. When sampled at 13.5 MHz each line of the format has exactly 770 samples. It is clear therefore that 585 lines is sufficient to contain the 576 active lines of the 625-line format at a 60-fields per second rate. As the active line width is only 720 samples there is still fifty samples of horizontal blanking.

The luminance data (D) from the luminance TBC 11Y is supplied by way of a process compensating delay 17Y to a luminance temporal shift register 16Y comprising four field stores (FS) 12Y, 13Y, 14Y and 15Y. The luminance TBC 11Y also supplies a temporal freeze signal (F) by way of the delay 17Y to the shift register 16Y. The chrominance TBC 11C supplies the chrominance data (D) by way of a processing compensating delay 17C to a chrominance temporal shift register 16C which comprises four field stores 12C, 13C, 14C and 15C. The chrominance TBC 11C also supplies a temporal freeze signal by way of the delay 17C to the shift register 16C. Associated with the shift register 16Y is a luminance interpolator 1Y which receives inputs from each of the field stores 12Y, 13Y, 14Y and 15Y, and derives the 585-line format. The output of the luminance interpolator 1Y is supplied to a 2-field luminance TBC 18Y. Associated with the shift register 16C is a chrominance interpolator 1C which receives inputs from each of the field stores 12C, 13C, 14C and 15C, and also derives the 585-line format. The output of the chrominance interpolator 1C is supplied to a 2-field chrominance TBC 18C. When the outputs of the TBCs 11Y and 11C are frozen, during a repeat field, the shift registers 16Y and 16C are also frozen, so that four distinct consecutive fields of the input always exist in the shift registers 16Y and 16C. Thus the shift registers 16Y and 16C are used to provide the temporal taps for the interpolators 1Y and 1C. The present invention is particularly concerned with the interpolators 1Y and 1C.

Each temporal tap produces four line taps at a position depending on the motion vectors, so that a two-dimensional filter can be used to provide the necessary interpolation. The interpolated picture will contain 576 active lines, so that a correct picture will be obtained when every sixth line one field is dropped. The 484 lines left produce the active picture portion of the 525-line format. To enable lines to be dropped in this way, the outputs from the interpolators 1Y and 1C are supplied to the 2-field TBC 18. The TBCs 18Y and 18C write in all 576/2 lines, but only read out the required 484/2 lines to provide the required output television signal. The outputs of the luminance TBC 18Y and of the chrominance TBC 18C are supplied to a multiplexer 34 which multiplexes the luminance components Y and the chrominance components UV to provide output CCIR 601 data in the form of a digital 525-line 60-fields per second television signal.

The control 32 supplies control signals (C) to the luminance TBC 11Y and to the chrominance TBC 11C. The control 32 also supplies control signals to the luminance TBC 18Y and the chrominance TBC 18C. It also supplies interpolation control signals (IC) to the luminance interpolator 1L and the chrominance interpolator 1C.

The luminance data only, as supplied by the luminance TBC 11Y, is also supplied to the motion analyzer 2 shown in the upper part of FIG. 2, so that motion vectors can be generated. In fact a frame delay is necessary between the TBCs 11Y and 11C and the shift registers 16Y and 16C to allow for the time taken to process the motion vectors. The freezing of the shift registers 16Y and 16C must therefore also be delayed by one frame, and these delays are provided by the delays 17Y and 17C.

The motion analyzer 2 comprises a vector interface 35 to which the luminance data from the luminance TBC 11Y is supplied, together with the interpolation control signal from the control 32. The vector interface 35 supplies data interpolated to 625 lines to a vector filter 36 and a vector calculator 37 which together perform the motion estimation described above. The output of the vector calculator 37 is supplied to a modal motion vector processor 38 and also to a sub-pixel motion estimator. The motion vector processor 38 supplies four outputs and the sub-pixel motion estimator one output to a motion vector reducer 40 which supplies four outputs to a vector selector 41, with which the present invention is particularly concerned.

The vector interface 35 also supplies the data interpolated to even fields to a processing compensating delay 42 to which it also supplies the received interpolation control signal, and also a temporal freeze signal (F) generated at the vector interface 35. The data from the delay 42 is supplied to a temporal shift register 43 which comprises three field stores 44, 45 and 46 which supply respective data outputs to the vector selector 41. The delay 42 supplies the interpolation control signal to the vector selector 41 which supplies the selected motion vector to a recursive motion vector filter 47, the output of which is the motion vector data which is supplied to the luminance interpolator 1Y and to the chrominance interpolator 1C.

The way in which the motion analyzer 2 derives the motion vector data has been described in detail above, and will be further described below, but the operation of the elements 35 to 43 and 47 will now be briefly described.

The vector interface 35 receives the luminance data from the luminance TBC 11Y, and the interpolation control signals from the control 32. It supplies 625-line data, normally contained within the 585/60 format, to the vector filter 36. It also supplies data to the delay 42. These data must contain a picture which is the same line standard as the required output, again normally contained within the 585/60 format. Each field of the interpolated data is also made to appear even.

The vector filter 36 produces the filtered picture data required for steps 1 to 5 above of the motion detection. The filtered picture data are supplied in sample reduced form to the vector calculator 37.

The vector calculator 37 operates on the filtered and sample-reduced data from the vector filter 36 using an algorithm described in the terms of the steps 1 to 5 above of the motion detection. The process is essentially a two-dimensional binary search for motion down to pixel/line resolution. For each field, 1200 motion vectors are generated and are supplied to both the modal motion vector processor 38 and to the sub-pixel motion estimator 39. It also supplies surrounding weighted absolute difference (WAD) values as calculated by step 5 above to the sub-pixel motion estimator 39. For details of WAD calculations, see 'Advances in Picture Coding', Musmann et al, Proceedings of the IEEE, April 1985. The specific WAD value which is the minimum in step 5 above of the motion detection provides a figure of merit (FOM).

The vector processor 38 calculates the four most common motion vectors that are detected in each field and supplies them to the vector reducer 40.

The sub-pixel motion estimator 39 receives the motion vectors from the vector calculator 37 together with the surrounding WAD values. From these it estimates sub-pixel movement to be appended to the motion vector values. With each motion vector its corresponding final WAD value is also supplied to the vector reducer 40.

The vector reducer 40 receives the motion vectors from the vector processor 38 and from the sub-pixel motion estimator 39. For each motion vector from the sub-pixel motion estimator 39, the six motion vectors closest to it are grouped together. For each motion vector there are then eleven choices. The reduction process selects four motion vectors from the eleven for supply to the vector selector 41.

The vector reducer 40 supplies the vector selector 41 with four representative motion vectors for each sixteen pixel by eight line block of the picture. By comparing pixels over three fields, the vector selector 41 selects the single best motion vector for each pixel in the picture, as described in more detail below. The motion vector selected is supplied to the motion vector filter 47.

The delay 42 delays the data by one frame less twenty-one lines to compensate for other delays in the system.

The temporal shift register 43 holds and supplies the three fields of data used by the vector selector 41.

The motion vector filter 47 tracks a motion vector from one field to another so applying some filtering to the motion vectors by combining motion vectors in different fields, so reducing motion detection errors. The output of the motion vector filter 47 is supplied to the luminance and chrominance interpolators 1Y and 1C to control the alignment of the field data.

Exactly the same hardware can be used as a slow motion processor with good motion portrayal for either a 615/50 or a 525/60 television signal. It is not however necessary to use the vertical interpolator to provide the line number conversion. In all cases the control 32 determines what action is required by recognizing the input/output standard from the input and output field synchronization pulses. In slow motion the input field polarity is used.

Whereas in 50-fields per second to 60-fields per second conversion a field was occasionally repeated, in slow motion the field is repeated the same number of times as the input field is repeated. As repeated fields are not written into the shift registers 16Y and 16C, the shift registers 16Y and 16C again contain distinct consecutive fields. Indeed if a video tape recorder reproduces without any interpolation of its own, the original interlace structure is maintained allowing full resolution pictures to be produced. The temporal offset required is calculated by comparing the actual field rate pulses, be they 50-fields per second or 60-fields per second, with the rate at which a new field is received. To determine the temporal offset in this way, the system needs a signal to be available which indicates the true field polarity of the field being repeatedly replayed. The vertical interpolator will always produce the field polarity required at the output.

Conceptually the TBCs 11Y and 11C are not really required for slow motion operation, but their presence does provide a frame synchronization facility and also simplifies the system configuration.

Figure 3:
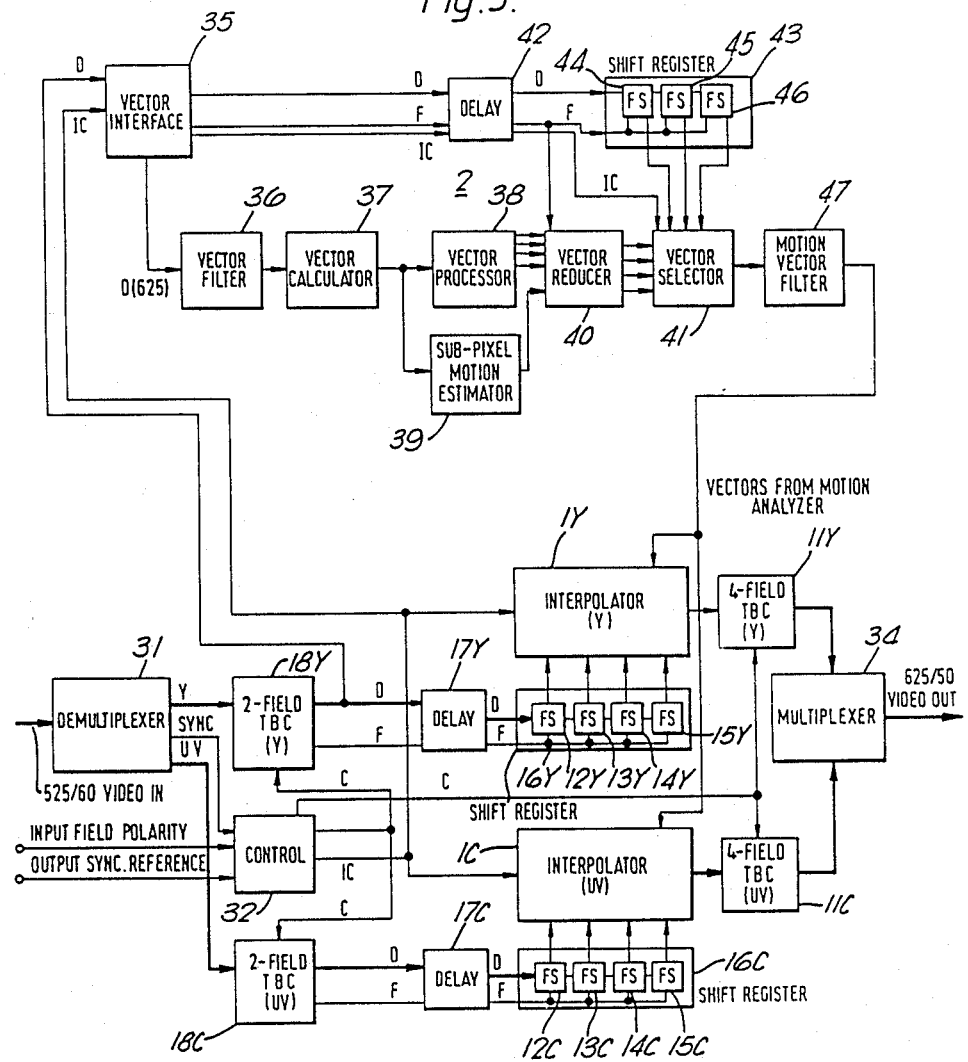
FIG. 3 shows in block diagrammatic form a second television standards converter.

The second standards converter for converting an input digital 525-line 60-fields per second television signal to an output digital 625-line 50-fields per second television signal is shown in detailed block form in FIG. 3.

In this case, interpolation requires that all the input data is available in a consecutive form. In this case it would not therefore be possible to convert to 50-fields per second before the interpolators 1Y and 1C. The input data however, contains only 484 active lines and the interpolators 1Y and 1C must product 576. The 2-field TBCs 18Y and 18C are therefore positioned at the front of the standards converter to provide the necessary time slots for 484-line to 576-line conversion.

The original continuous line structure is written into the TBCs 18Y and 18C but is read out in the 585-line standard with approximately every sixth line being blank. The interpolators 1Y and 1C are then used to produce a continuous picture at the output line rate by freezing its line stores during the blank input line, and producing the required additional line at the output, so ensuring that a spatially correct picture is produced. The required temporal offset is detected and applied as in the first standards converter, although the interpolation is applied such that a field can occasionally be dropped leaving the motion smooth. The field is dropped such that 60-fields per second to 50-fields per second conversion is achieved. The dropping of a field is achieved by using the 4-field TBCs 11Y and 11C at the output.

Thus the second standards converter differs from the first standards converter shown in FIG. 2 in only minor respects. In particular, the luminance TBCs 11Y and 18Y are interchanged, and the chrominance TBCs 11C and 18C are also interchanged. Also, no temporal freeze signals are required.

In both cases the control 32 has various functions as follows; controlling the reading and writing of the TBCs 11Y, 11C, 18Y and 18C; generating a temporal offset number, and in the case of the first standards converter the temporal freeze signal, and generating a vertical offset number together with vertical interpolation control signals. These functions will now be described in more detail.

Firstly, the 2-field luminance and chrominance TBCs 18Y and 18C always switch between field stores at the end of every 60 Hz field. However, the operation of the 4-field luminance and chrominance TBCs 11Y and 11C depend on the mode of operation, and their control is also associated with the generation of the temporal offset signal. In fact, the control of the luminance and chrominance TBCs 11Y and 11C is determined from the input and output field synchronizing signals.

The derivation of the temporal offset signal in the case of 525/60 to 625/50 operation will now be described with reference to FIGS. 4 and 5.

In FIG. 4, the control 32 is shown as including a line counter 61, and first and second latches 62 and 63. A line clock signal is supplied to a clock terminal of the line counter 61, while the input field synchronizing signal is supplied to a reset terminal of the line counter 61 and to a clock terminal of the second latch 62. The output field synchronization signal is supplied to a clock terminal of the first latch 62. The output of the line counter 61 is supplied to the input of the first latch 62, the output of which is supplied to the input of the second latch 63, the output of which is the temporal offset signal supplied to the luminance and chrominance shift registers 11Y, 11C, 18Y and 18C.

The input and output field synchronizing signals are shown in FIGS. 5A and 5B respectively. FIG. 5C shows the output of the line counter 61 which repetitively counts from 0 to 524. FIGS. 5D and 5E show the outputs of the first and second latches 62 and 63 respectively. By latching the counter 61, the required proportion of the input field period is determined. The temporal shift value tn indicates the position between two input fields where the output field must be interpolated such that when the shaded field shown in FIG. 5A is dropped, continuous motion still occurs. Thus, the field which uses the temporal offset shown shaded in FIG. 5E is the one that is dropped. It will be seen by reference to FIGS. 5A and 5B, that the field which is dropped is the one which does not have a new temporal shift associated with it. The field (arrowed) which is to be dropped is indicated to the following circuit by the temporal freeze signal.

The derivation of the temporal offset signal in the case of 625/50 to 525/60 operation will now be described with reference to FIGS. 6 and 7.

In FIG. 6, the control 32 is shown as including a line counter 71 and a latch 72. A line clock signal is supplied to a clock terminal of the line counter 71, while the input field synchronizing signal is supplied to a reset terminal of the line counter 71. The output field synchronization signal is supplied to a clock terminal of the latch 72. The output of the line counter 71 is supplied to the input of the latch 72, the output of which is the temporal offset signal supplied to the luminance an chrominance shift register 11Y, 11C, 18Y and 18C.

The input and output field synchronizing signals are shown in FIGS. 7A and 7B respectively. FIG. 7C shows the output of the line counter 71 which repetitively counts from 0 to 624. FIG. 7D shows the output of the latch 72. By latching the counter 71, the required proportion of the input field period is determined. Thus, the temporal shift value tn again indicates the position between two input fields where the output field must be interpolated, such that if the shaded field is repeated, continuous motion still occurs. The field which is repeated is the one which has two temporal shift values associated with it. The field (arrowed) which is to be repeated is indicated to the following circuitry by the temporal freeze signal.

The deviation of the temporal offset signal in the case of slow motion whether at 525/60 to 525/60 or 625/50 to 625/50 is the same, and will now be described with reference to FIGS. 8 and 9.

Figure 8:
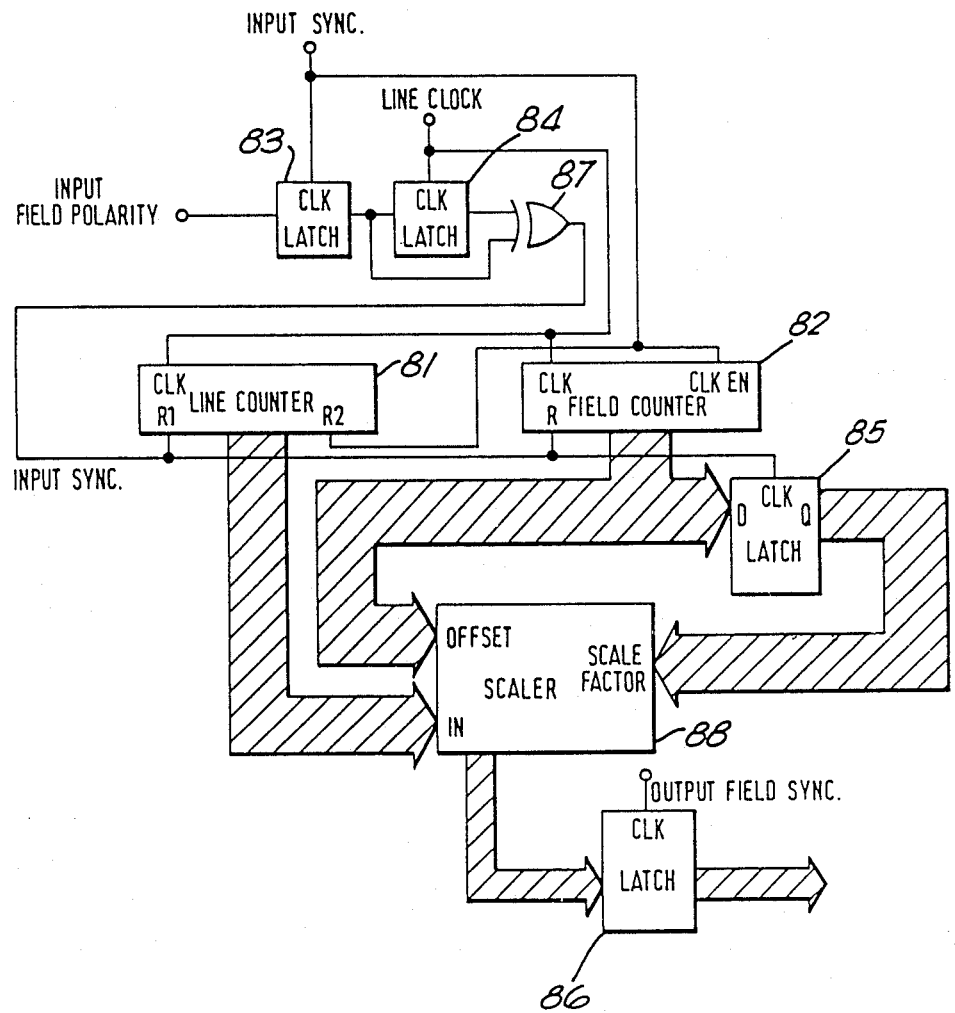
FIG. 8 shows part of the standards converter of FIG. 2 in more detailed block diagrammatic form.

In FIG. 8, the control 32 is shown as including a line counter 81, a field counter 82, first to fourth latches 83 to 86, an exclusive-OR gate 87 and a scaler 88. The input field synchronizing signal is supplied to a clock terminal of the first latch 83, to a clock enable terminal of the field counter 82, and to a second reset terminal of the line counter 81. The input field polarity signal is supplied to the first latch 83 and thence to the second latch 84 and also to one input of the gate 87. The second latch 84 supplies an output to the second input of the gate 87, the output of which is supplied to a first reset terminal of the line counter 81, to a reset terminal of the field counter 82 and to a clock terminal of the third latch 85, which forms a speed detector latch. A line clock signal is supplied to a clock terminal of the second latch 84, and to respective clock terminals of the line counter 81 and the field counter 84. The output of the line counter 81 is supplied to an input terminal of the scaler 88, and the output of the field counter 82 is supplied to an input of the third latch 85 and also to an offset input terminal of the scaler 88. The output field synchronizing signal is supplied to a clock terminal of the fourth latch 86. The output of the third latch 85 is supplied to a scale factor terminal of the scaler 88, the output of which is supplied to the fourth latch 86, the output of which is the temporal offset signal.

Figure 9A:
Figure 9B:
Figure 9C:
Figure 9G:

The input field synchronizing signal and the input field polarity signal are shown in FIGS. 9A and 9B respectively. FIG. 9C also indicates the input field synchronizing signals and FIG. 9D the output field synchronizing signals. FIGS. 9E and 9F indicate the operations of the field counter 82 and the line counter 81, which are respectively counting fields and lines from O to N. FIG. 9G indicates the output of the fourth latch 86 which is the temporal offset signal. FIG. 9H indicates the temporal freeze signal (which is active when low), and, as indicated by the arrows, the shaded field that uses the temporal offset shown is a repeat of the previous field that used the temporal offset t1.

To generate the temporal freeze signal, the control 32 is shown in FIG. 10 as including a synchronous RS flip-flop 91, a latch 92, an inverter 93 and an AND-gate 94. The output field synchronizing signal is supplied to one input of the flip-flop 91, to the input of the inverter 93 and to a clock enable terminal of the latch 92. The input field synchronizing signal is supplied to the other input of the flip-flop 91, while a line clock signal is supplied to clock terminals of the flip-flop 91 and the latch 92. The output of the flip-flop 91 is supplied to one input of the gate 94, which receives at its other input the output of the inverter 93. The output of the gate 94 is supplied to the input of the latch 92, the output of which forms the temporal freeze signal. The operation of this circuit is such that if more than one output field synchronizing pulse follows an input field synchronizing pulse, a freeze occurs.

Referring back to FIG. 2, the generation of the vertical offset number by the control 32 will now be described. The same address generator which reads data from the luminance TBC 11Y into the luminance interpolator 1Y and the motion analyzer 2, also addresses an erasable programmable read-only memory (EPROM) which provides the vertical offset number together with vertical freeze signals when required.

(in the FIG. 3 arrangement which is used for 525/60 to 625/50, the read addresses of the luminance TBC 18Y are used, but in all other modes the read addresses of the luminance TBC 11Y are used.)

The vertical offest number is generatd assuming that both the input and the output fields are even, and it then indicates the position between two input lines where the output line must be interpolated such that a non-distroted picture would be produced if:

a line were occasionally dropped in 625/50 to 525/60 conversion,
or
a line were occasionally repeated in 525/60 to 625/50 conversion.

When a line is repeated by the luminance TBC 11Y (18Y), a vertical freeze signal is generated.

If the input fields are not both even, then the interpolators 1Y and 1C must make use of the input field polarity and output field polarity to ensure correct interpolation.

The contents of the EPROM are generated in a way similar to that described above in connection with FIG. 10 for the temporal offset signal, using the known line position in both a 525 and a 625 picture.

The form and operation of the luminance interpolator 1Y (FIG. 2), with which the present invention is particularly concerned, will now be described in more detail with reference to FIGS. 11 to 15. The form and operation of the chrominance interpolator 1C is similar, so it will not be separately described.

Whereas prior standards converter interpolators have a fixed sample space array, the interpolator 1Y has a dynamically changing sample space array changing on a pixel basis according to the function defined by the detected motion as represented by the motion vector supplied by the motion vector filter 47 (FIG. 2), the field position and the interpolation command. This results in the elimination of standards conversion interpolation artifacts such as multiple imaging, judder and blurring on the interpolated output.

Figure 11:
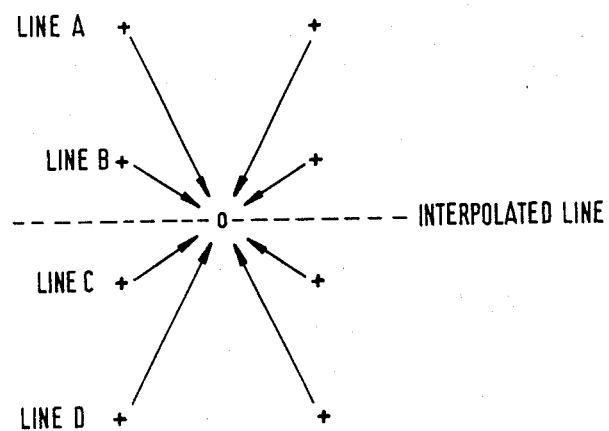
FIGS. 11 and 12 show diagrammatically how an interpolated pixel is generated from surrounding available pixels.

Generally, interpolation in relation to standards conversion is the application of a digital filter in the horizontal and vertical dimensions and the temporal dimension to an array of pixels fixed in time and space, to produce a new array of pixels in time and space. hence, the interpolation process produces an output pixel from the weighted sum of the surrounding fixed pixels, as indicated diagrammatically in FIG. 11, in which each X represents a fixed (available) pixel and O represents the interpolated pixel.

So as more readily to understand the advantages of the motion adaptive interpolator to be described, the process of normal interpolation, and the artifacts produced by ignoring motion in an image, will first be described.

Figure 12:
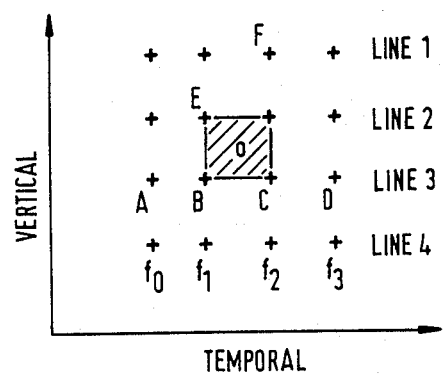

In non-motion compensating standards conversion, the interpolators calculate the output pixel magnitude by the weighted sum of the pixels of an array of pixels which is fixed in time and space. FIG. 12 shows a simplified diagram of the vertical/temporal sample space used for interpolation, ignoring the problems of interlace, where each X represents a fixed (available) pixel and O represents the interpolated pixel.

The magnitude of the output interpolated pixel is calculated from the weighted sum of the pixels shown in the 4×4 array, the position of the output pixel being determined by the interpolation command derived from the comparison of input and output fields syncs and line numbers. This sample space will give good results for an image of a stationary scene, as the data will align on sequential fields, because A correlates to B to C and to D.

If however motion occurs in the scene, for example vertical motion causing A to correlate to E on field F1 and to F on field f2, then using the same interpolation sample space as for the stationary scene (as in FIG. 12) will introduce errors such as multiple imaging, judder and blurring as uncorrelated pixels are summed to produce the output.

In order to remove these artifacts associated with normal standards conversion, correlating pixels mus be aligned in each field before interpolation. This is accomplished in the present case by having a variable data delay at the input to each interpolator tap, which allows the correlating pixels to be aligned on each field according to the detected motion. Having detected motion within a scene the interpolator function takes the motion vector and an interpolation command together with the video data from field stores and generates a new motion compensated interpolated field.

Figure 13:
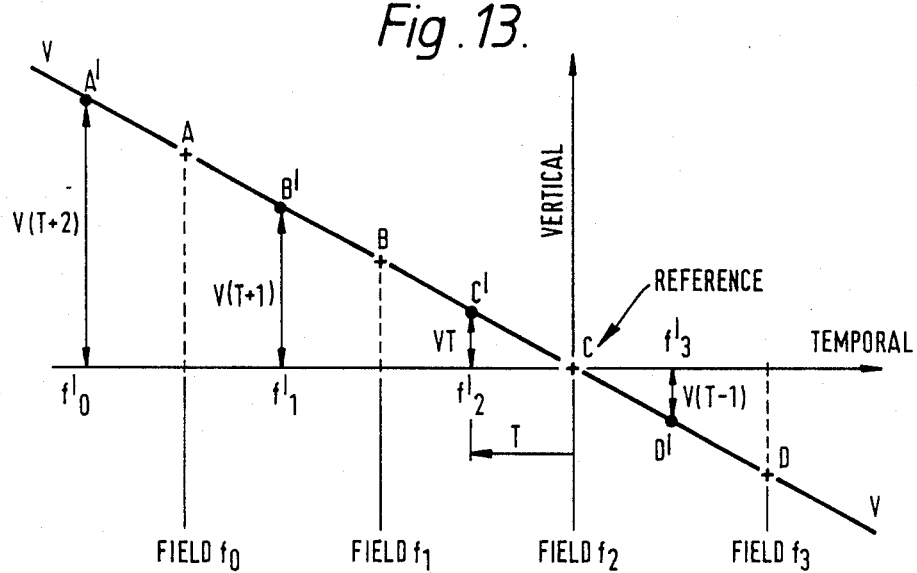
FIG. 13 shows diagrammatically a two-dimensional representation of linear motion interpolation.

This will now be further described with reference to an example shown in FIG. 13. If motion is detected between fields f1 and f2 such that the pixel being analyzed moves from B to C, a motion vector V is generated as described above, indicating the number of pixels the pixel has moved during one input field period, both horizontally and vertically. The interpolator receives the motion vector V and assumes linear motion of A to B to C to D over the four fields f0, f1, f2 and f3. The interpolation command T specifies the temporal position of the interpolated field as a fraction of the input to output field spacing, which in FIG. 13 corresponds to a field at f'2. This means that the output pixel corresponds to a pixel at C'. To generate this pixel with a 4-field motion adaptive interpolator requires taking the weighted sum of the pixels at A', B', C' and D'. This is done by shifting each pixel within a field by an amount corresponding to the function of the field position, the detected movement (motion vector V), and the interpolation command T, such that the correlating pixels A;, B;, C' and D' can be processed simultaneously.

The correlating pixels are aligned by use of a 32-line store on each vertical tap. Data is written into these stores and read out sixteen lines later (if no vertical movement has been detected). If motion is detected, the motion vector V is added to the vertical address of the line stores, which effectively shifts the picture up or down. The picture is shifted horizontally, in a similar manner by adding the motion vector V to the horizontal read address of the line store. The four vertical and two horizontal taps on each field are shifted by the same amount. However, each field calculates its own motion vector V according to its position within the filter.

Hence each of the four fields are shifted by a different amount to align correctly.

The amount of shift and interpolation required for each pixel is derived from a function described by:

(detected movement) × (temporal interpolation + field position)

From this function each pixel is given a horizontal integral shift and a sub-pixel interpolation value. For the vertical movement, the function must be further expanded to include an additional vertical shift required for scan conversion. Hence the vertical shift and interpolation is derived from:

(detected movement) ×

(temporal interpolation + field position) +

(scan conversion interpolation)

Figure 14:
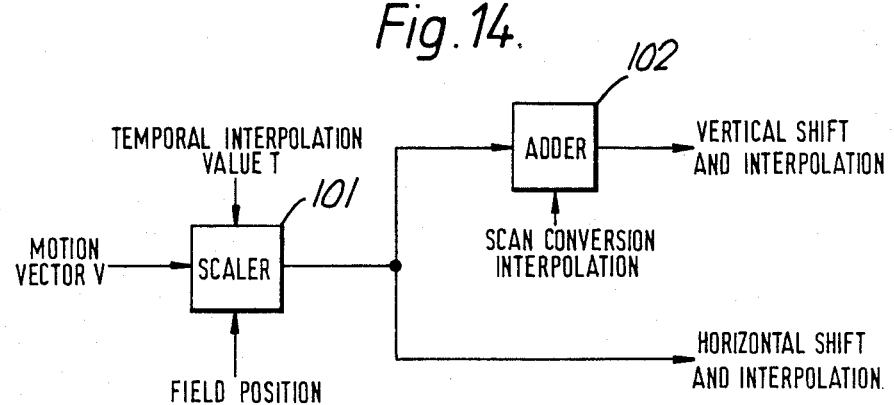
FIG. 14 shows part of an interpolator in the standards converter of FIG. 2 in more detailed block diagrammatic form.

Thus by using the above functions the integral shift values and the sub-pixel shift and interpolation values can be calculated in one step, indicated diagrammatically in FIG. 14, by the use of a scaler 101 and an adder 102 receiving inputs an supplying outputs as shown, in accordance with the above two relationships.

The luminance interpolator 1Y, unlike non-motion compensated standards converter interpolators, is configured as a three-dimensional variable separable finite impulse response digital interpolation filter operating in the horizontal, vertical and temporal domains. Alternatively, it could be configured as a three-dimensional finite impulse response digital interpolation filter operating of the horizontal, vertical and temporal domains, but not being variable separable. In normal standards converters there is no horizontal interpolation, as the number of samples per active line period are so similar that they are assumed to be co-sited. This results in minimal picture distortion. However, in the luminance interpolator 1Y, horizontal interpolation is necessary for sub-pixel motion portrayal. Pixel movement is compensated for by the shifting of the video data in the variable length line stores, but sub-pixel movement is compensated for, in both the horizontal and vertical directions, by interpolation between samples. Hence, the motion is compensated for by a combination of picture shifting and additional interpolation.

The interpolator is a 32-tap filter with two horizontal taps by four vertical taps by four temporal taps.

Figure 15:
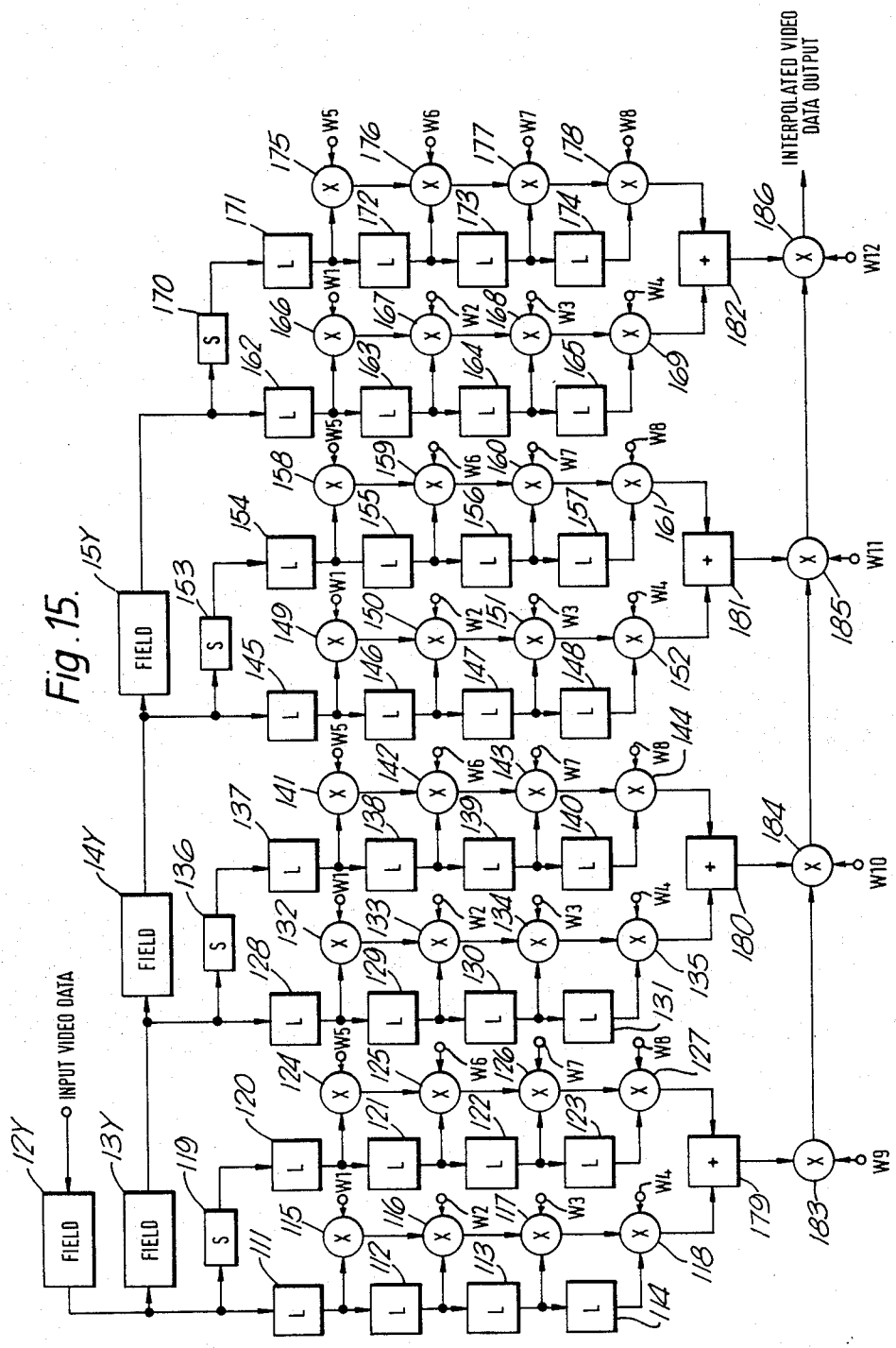
FIG. 15 shows an interpolator in the standards converter of FIG. 2 in more detailed block diagrammatic form.

The luminance interpolator 1Y is shown in more detail in FIG. 15, together with the four field stores 12Y, 13Y, 14Y and 15Y of the shift register 16Y which effectively form part of the interpolator 1Y. The output of the field store 12Y is connected to four variable line delays (L) 111 to 114, the outputs of which are connected to respective multiplier accumulators 115 to 118. The output of the field store 12Y is also connected via a one pixel or sample delay (S) 119 to four variable line delays 120 to 123, the outputs of which are connected to respective multiplier accumulators 124 to 127. The output of the field store 13Y is connected to four variable line delays 128 to 131, the outputs of which are connected to respective multiplier accumulators 132 to 135. The output of the field store 13Y is also connected via a one pixel delay 136 to four variable line delays 137 to 140, the outputs of which are connected to respective multiplier accumulators 141 to 144. The output of the field store 14Y is connected to four variable line delays 145 to 148, the outputs of which are connected to respective multiplier accumulators 149 to 152. The output of the field store 14Y is also connected via a one pixel delay 153 to four variable line delays 154 to 157, the outputs of which are connected to respective multiplier accumulators 158 to 161. The output of the field store 15Y is connected to four variable line delays 162 to 165, the outputs of which are connected to respective multiplier accumulators 166 to 169. The output of the field store 15Y is also connected via a one pixel delay 170 to four variable line delays 171 to 174, the outputs of which are connected to respective multiplier accumulators 175 to 178.

The multiplier accumulators 118 and 127 are connected to the inputs of an adder 179, the output of which is connected to a multiplier accumulator 183. Likewise, the outputs of the multiplier accumulators 135 and 144; 152 and 161; and 169 and 178 are connected to the inputs of respective adders 180, 181 and 182, the outputs of which are connected to one input of respective multiplier accumulators 184, 185 and 186. The output of the multiplier accumulator 183 is connected to another input of the multiplier accumulator 184, the output of which is connected to another input of the multiplier accumulator 185, the output of which is connected to another input of the multiplier accumulator 186. The output of the multiplier accumulator 186 provides the interpolated video data output.

The weighting coefficients W1 to W8 are used to produce a 2-dimensional horizontal/vertical filter, and the weighting coefficients W9 to W12 are used to produce a variable separable temporal response.

Figure 16:
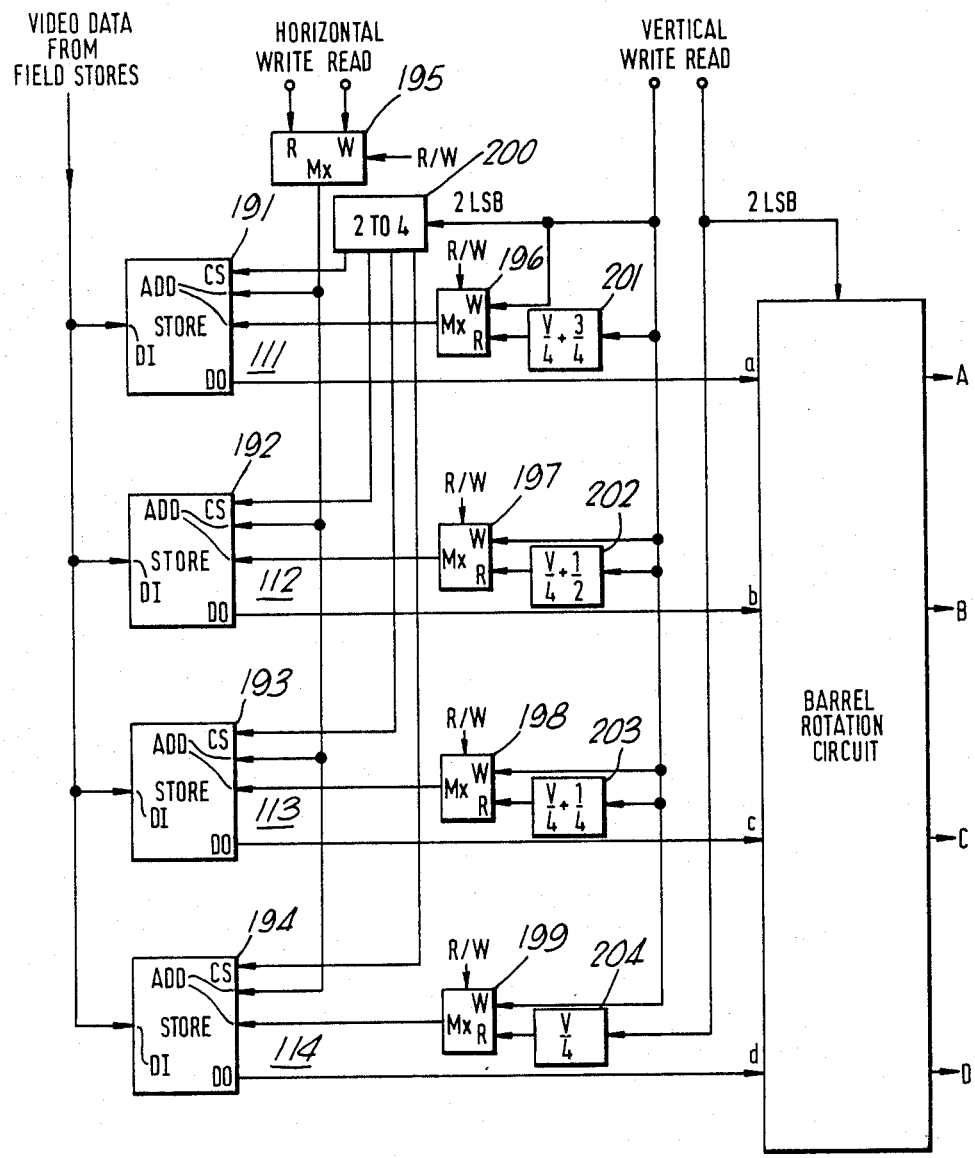
FIG. 16 shows part of FIG. 15 in more detailed block diagrammatic form.

The arrangement of and circuits associated with four of the variable line delays 111 to 114 will now be described in more detail with reference to FIG. 16. The variable line delays 111 to 114 form a 32-line store which is configured as four 8-line stores 191 to 194, to data inputs (DI) of each of which the video data from the appropriate one of the field stores 12Y, 13Y, 14Y and 15Y, in the present case the field store 12Y, are supplied.

Horizontal write and read addresses are supplied by way of a multiplexer (MX) 195 to address inputs (ADD) of the stores 191 to 194.

Vertical write addresses are supplied by way of write inputs (W) of multiplexers 196 to 199 to further address inputs of the respective stores 191 to 194. The two least significant bits (2LSB) of the vertical write addresses are also supplied by way of a 2-bit to 4-bit converter 200 to chip select inputs (CS) of the respective stores 191 to 194 to effect the necessary stepping through the lines.

Vertical read addresses are supplied to function modifier circuits 201 to 204 which supply their outputs by way of read inputs (R) of the respective multiplexers 196 to 199 to the select inputs (S) of the respective stores 191 to 194. The function modifier circuits 201 to 204 divide the vertical address by four and add $\frac{3}{4}$, $\frac{1}{2}$, $\frac{1}{4}$ or 0 respectively, as indicated, and effect any necessary truncation to remove fractions. The two least significant bits (2LSB) of the vertical read addresses are also supplied to a barrel rotation circuit 204, which also receives four data a, b, c and d from respective data outputs (DO) of the stores 191 to 194, and supplies four data outputs A, B, C and D to the appropriate respective multiplexer accumulator, in the present case the multiplexer accumulators 155 to 188 (FIG. 15).

In operation, lines of data are alternatively written in the stores 191 to 194, so that each contains every fourth line. When the stores 191 to 194 are read, the vertical address is modified by the respective function modifier circuit 201 to 204. This ensures that the required four pixels are available for each vertical address. However, the order of the pixels will not necessarily be in the required order, and the barrel rotation circuit 204 puts them in the required ascending order. The truth table for the barrel rotation circuit 205 is as follows:

| 2LSB | A | B | C | D |
|------|---|---|---|---|
| 00   | a | b | c | d |
| 01   | b | c | d | a |
| 10   | c | d | a | b |
| 11   | d | a | b | c |

Thus for every read address the data of four vertically aligned pixels are produced such that pixel A is above B, B is above C, and C is above D, and the respective data are then multiplied by the respective weighting coefficient.

In summary, the main difference between the interpolator 1Y and non-motion compensated standards converter interpolators, is that the interpolar 1Y has a dynamically changing sample space array varying on a pixel basis according to the function defined by the motion vector, the field position and the interpolation command. Thus, the interpolator 1Y uses a control method which aligns fields to sub-pixel resolution. Moreover, the interpolation is performed in vertical and temporal space by a 4-field interpolation process using an interlaced field structure. Line scan and field rate conversion are performed simultaneously, which removes both vertical and temporal alias artifacts.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

We claim:

1. A method of motion compensated interpolation of digital television images comprising applying input video data corresponding to said television images to a three-dimensional finite impulse response interpolation filter operating in the horizontal, vertical and temporal domains.

2. A method according to claim 1 wherein line scan and field rate conversion are performed simultaneously.

3. A method according to claim 1 wherein said filter is a variable separable filter.

4. A method according to claim 3 wherein said interpolation is performed in vertical and temporal space using a 4-field interpolation process on an interlaced field structure.

5. A method according to any one of the preceding claims wherein fields are aligned to sub-pixel resolution independence on motion vectors representing motion of a pixel in said image.

6. A method according to claim 5 wherein said motion vectors are derived by determining motion in said image at points spaced a predetermined number of samples horizontally and a predetermined number of samples vertically by a block matching technique.

7. A method according to claim 6 wherein said block matching technique comprises the steps of:

testing for minimum difference in three positions, the centre position of a block, a predetermined number of samples to the left, and the same predetermined number of samples to the right;

starting from the point indicated above, testing for minimum difference in nine positions symmetrically distributed about the above starting point in steps of a smaller predetermined number of samples or lines;

starting from the point indicated above, testing for minimum difference in nine positions symmetrically distributed about the above starting point in steps of a still smaller predetermined number of samples or lines;

starting from the point indicated above, testing for minimum difference in nine positions symmetrically distributed about the above starting point in steps of a still smaller predetermined number of samples or lines; and starting from the point indicated above, testing for minimum difference in nine positions symmetrically distributed about the above starting point in steps of one sample or line.

8. A method according to claim 7 comprising a further step, subsequent to the last step of claim 7, of comparing the difference produced at the final position indicated by said last step with the two differences above and below to adjust the vertical vector value, and with the two differences to the left and right to adjust the horizontal vector value.

9. An apparatus for effecting motion compensated interpolation of digital television images comprising a three-dimensional finite impulse response interpolation filter operating in the horizontal, vertical and temporal domains.

10. Apparatus according to claim 9 which performs line scan and field rate conversion simultaneously.

11. Apparatus according to claim 9 wherein said filter is a variable separable filter.

12. Apparatus according to claim 11 which performs interpolation in vertical and temporal space using a 4-field interpolation process on an interlaced field structure.

13. A 625-line 50-fields per second to 525-line 60-fields per second television standards converter comprising:

a 4-field time base corrector for receiving an input 625-line 50-fields per second digital television signal;

a motion analyzer connected to the output of said time base corrector for analyzing motion in said input television signal;

a shift register also connected to the output of said time base corrector;

an apparatus according to claim 9 for deriving samples of a required output 525-line 60-fields per second digital television signal in dependence on samples derived from said shift register and picture motion data derived by said motion analyzer; and a 2-field time base corrector for assembling said derived samples to form said output television signal.

14. A television standards converter according to claim 13 wherein said 4-field time base corrector derives a 585-line 60-fields per second time television signal from said input television signal for supply to said shift register.

15. A 525-line 60-fields per second to 625-line 50-fields per second television standards converter comprising;
  a 2-field base converter for receiving an input 525-line 60 fields per second digital television signal;
  a motion analyzer connected to the output of said time base corrector for analyzing motion in said input television signal;
  a shift register also connected to the output of said time base corrector;
  an apparatus according to claim 9 for deriving samples of a required output 625-line 50-fields per second digital television signal in dependence on samples derived from said shift register and picture motion data derived by said motion analyzer; and
  a 4-field time base corrector for assembling said derived samples to form said output television signal.

16. A television standards converter according to claim 15 wherein said 2-field time base corrector derives a 525-line 60-fields per second television signal from said input television signal for supply to said shift register.

17. A television standards converter comprising an interpolation according to claim 9 wherein an input television signal representing said image is supplied to said interpolation filter by way of a time base corrector which produces therefrom a 585-line 60-fields per second television signal.

18. A television standards converter according to claim 17 wherein said input television signal is a 625-line 50-fields per second signal, and said time base corrector is a 4-field time base corrector.

19. A television standards converter according to claim 17 wherein said input television signal is a 525-line 60-fields per second signal, and said time base corrector is a 2-field time base corrector.

20. A slow motion processor comprising:
  an input circuit for receiving an input digital television signal;
  a motion analyzer for analyzing motion in said input digital television signal;
  a shift register for holding successive different fields of said input television signal;
  an apparatus according to claim 9 for deriving samples of a required slow motion output digital television signal in dependence on the degree of slow motion, samples derived from said shift register, and picture motion data derived by said motion analyzer; and
  a 2-field time base corrector for assembling said derived samples to form said slow motion output television signal.

21. A slow motion processor according to claim 20 wherein said input circuit is a 4-field time base corrector.

22. A slow motion processor according to claim 21 wherein said 4-field time base corrector derives a 585-line 60-fields per second television signal from said input television signal for supply to said shift register.

23. Apparatus according to claim 9 which aligns fields to subpixel resolution in dependence on motion vectors representing motion of a pixel in said image.

24. Apparatus according to claim 23 and further comprising means for deriving said motion vectors, said means comprising a vector filter and a vector calculator which determine motion in said image at points spaced a predetermined number of samples horizontally and a predetermined number of samples vertically by a block matching technique.

25. Apparatus according to claim 24 wherein said vector calculator is programmed to perform the following steps on a digitized signal representing said image and supplied to said vector calculator by said vector filter;
  testing for minimum difference in three positions, the centre position of a block, a predetermined number of samples to the left, and the same predetermined number of samples to the right;
  starting from the point indicated above, testing for minimum difference in nine positions symmetrically distributed about the above starting point in steps of a smaller predetermined number of samples or lines;
  starting from the point indicated above, testing for minimum difference in nine positions symmetrically distributed about the above starting point in steps of a still smaller predetermined number of samples or lines;
  starting from the point indicated above, testing for minimum difference in nine positions symmetrically distributed about the above starting point in steps of a still smaller predetermined number of samples or lines; and
  starting from the point indicated above, testing for minimum difference in nine positions symmetrically distributed about the above starting point in steps of one sample or line.

26. Apparatus according to claim 25 wherein said vector calculator is further programmed to perform subsequent to the last step of claim 15, the step of comparing the difference produced at the final position indicated by said last step with the two differences above and below to adjust the vertical vector value, and with the two differences to the left and right to adjust the horizontal vector value.

* * * * *